United States Patent
Skantar

[11] Patent Number: 5,817,934
[45] Date of Patent: Oct. 6, 1998

[54] HEAD OF TRAIN DEVICE

[75] Inventor: Elmer T. Skantar, E. Pittsburgh, Pa.

[73] Assignee: Westinghouse Air Brake Company, Wilmerding, Pa.

[21] Appl. No.: 807,795

[22] Filed: Feb. 28, 1997

Related U.S. Application Data

[62] Division of Ser. No. 504,642, Jul. 20, 1995.

[51] Int. Cl.$^6$ ..................................................... B61L 23/00
[52] U.S. Cl. ........................... 73/121; 303/86; 246/167 R
[58] Field of Search ........................... 73/39, 121; 303/1, 303/3, 86; 246/167 R, 189

[56] References Cited

U.S. PATENT DOCUMENTS

| | | | |
|---|---|---|---|
| 3,872,711 | 3/1975 | Atkinson et al. | 73/39 |
| 4,043,606 | 8/1977 | Wickham | 303/86 |
| 4,156,864 | 5/1979 | Ingram | 73/39 |
| 4,652,057 | 3/1987 | Engle et al. | 303/3 |
| 4,687,258 | 8/1987 | Astley | 303/3 |
| 4,847,770 | 7/1989 | Kane et al. | 73/39 |
| 5,016,840 | 5/1991 | Bezos | 246/187 R |
| 5,065,321 | 11/1991 | Bezos et al. | 701/35 |
| 5,180,213 | 1/1993 | Kingsbury | 303/86 |
| 5,186,700 | 2/1993 | Bezos et al. | 701/35 |
| 5,383,717 | 1/1995 | Fernandez et al. | 303/3 |
| 5,549,363 | 8/1996 | Kanjo et al. | 303/18 |
| 5,564,794 | 10/1996 | Hart | 303/3 |
| 5,681,015 | 10/1997 | Kull | 246/187 C |

Primary Examiner—Richard Chilcot
Assistant Examiner—Eric S. McCall
Attorney, Agent, or Firm—James Ray & Associates

[57] ABSTRACT

An automated terminal test system and performs a terminal test of brake equipment on a train. The system includes a test control box connected to a head of train locomotive and accessible from outside of such locomotive. Linked to such brake equipment, the test control box has a control for activating the test control box, applying and releasing the brakes, and charging and venting such brake pipe. The system also includes an end of train transceiver device connected to such brake pipe on a last railcar of such train. The end of train transceiver device monitors pressure within such brake pipe on such last railcar, senses movement of such last railcar, and communicates signals representative of such pressure monitored and such movement sensed. The system further includes a head of train transceiver device linked to such brake equipment and connected to such brake pipe on such locomotive. The head of train transceiver device monitors pressure within such brake pipe on such locomotive and transmits to such brake equipment the resulting head of train brake pipe pressure. The head of train transceiver device also relays to such brake equipment such last railcar brake pipe pressure data and such last railcar motion data both received from the end of train transceiver device. Through appropriate manipulation of the control, a railyard worker can apply and release the brake automatically and charge and vent such brake pipe automatically from outside such cab of such locomotive during such terminal test.

5 Claims, 10 Drawing Sheets

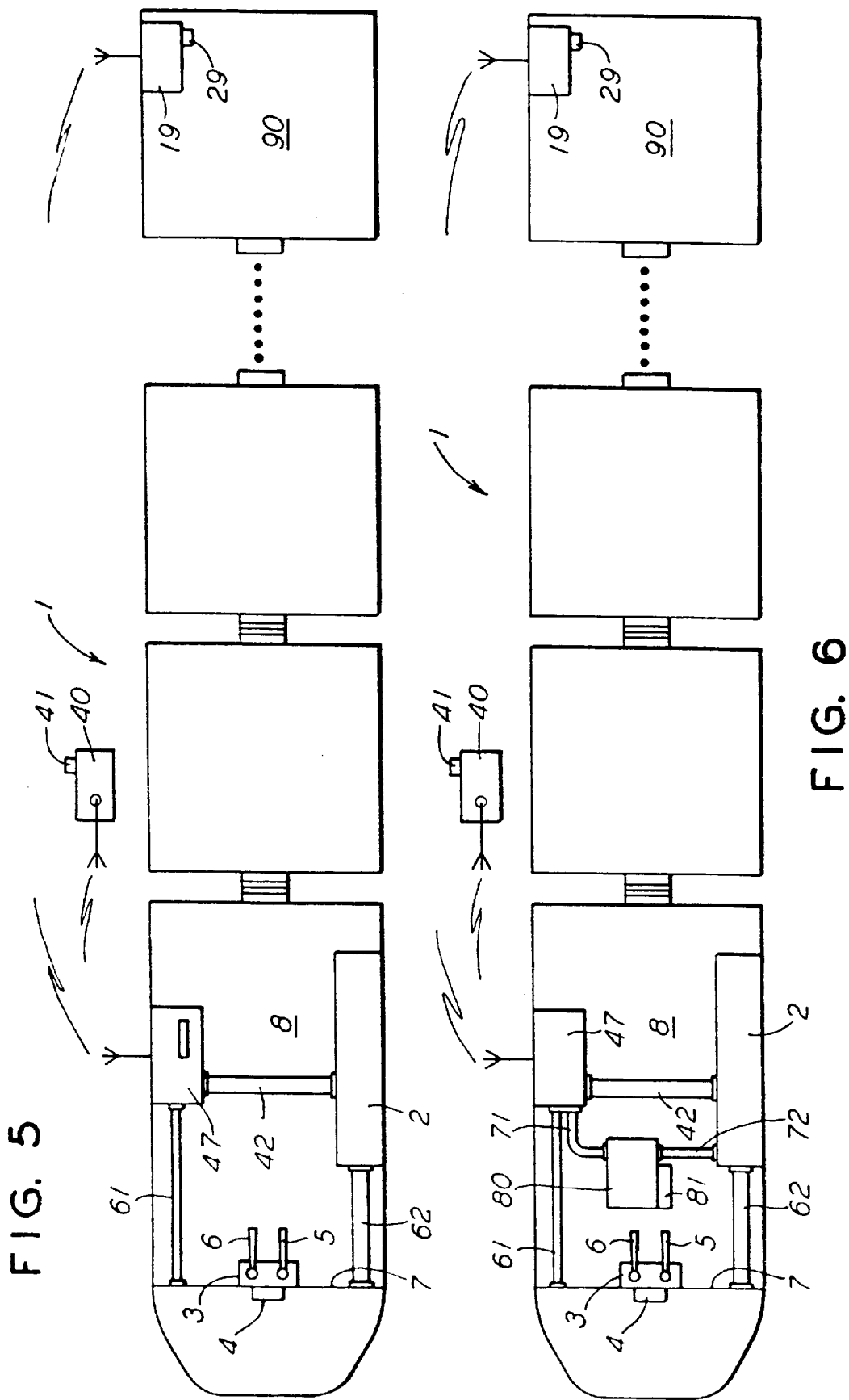

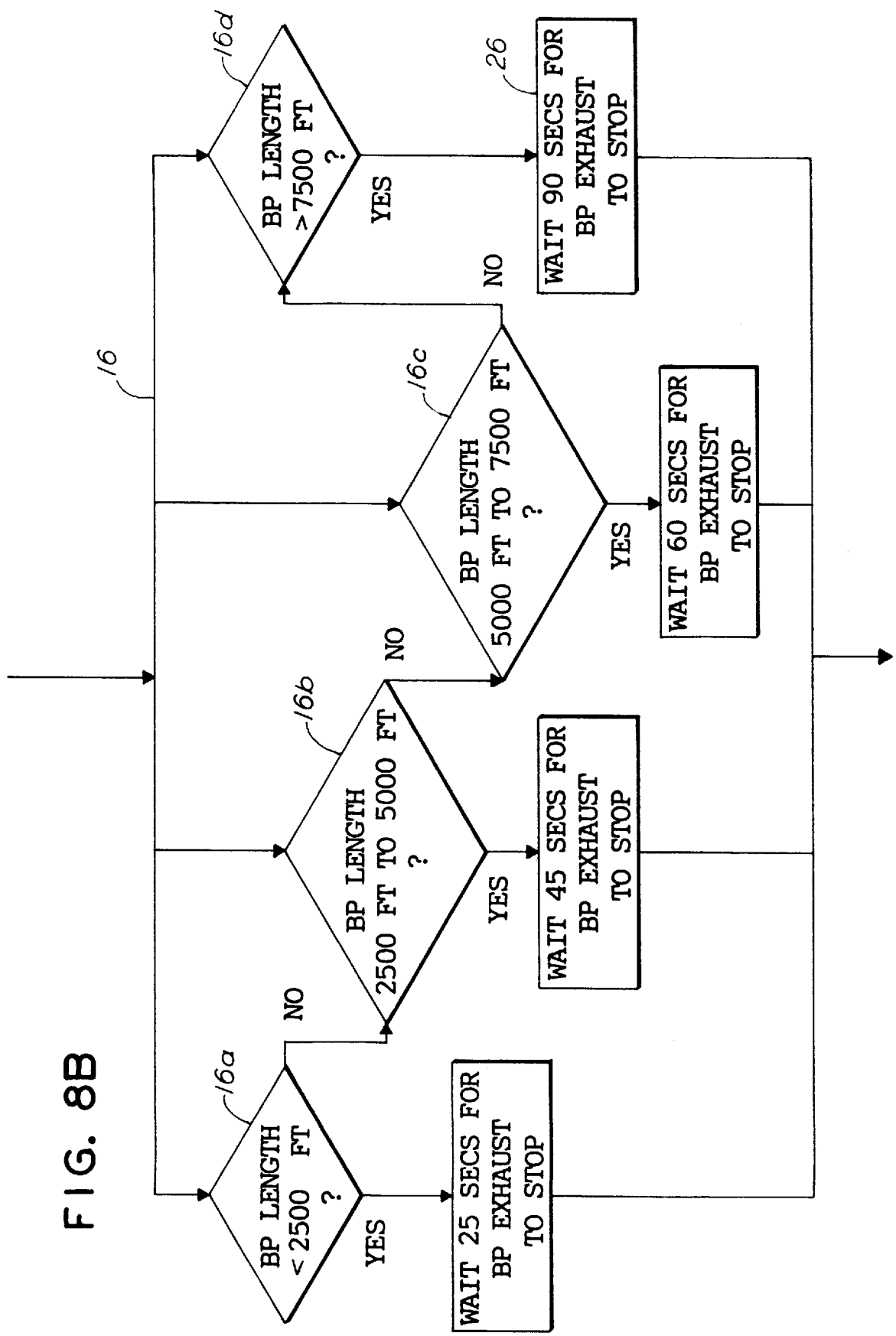

HEAD OF TRAIN DEVICE

This application is a Divisional Application of application Ser. No. 08/504,642, filed Jul. 20, 1995.

FIELD OF THE INVENTION

The present invention generally relates to a system for conducting a predeparture inspection and test of brake equipment on a train consist, and, more particularly, is concerned with an automated terminal test system for conducting such inspection and testing which reduces the labor and the amount of time required to perform such inspection and testing.

BACKGROUND OF THE INVENTION

As is generally well known in the railway brake equipment art, various procedures for predeparture inspection and brake testing have been employed in the railway industry since development of the first railcar trains well over a century ago. Mandated now by the Federal Railroad Administration (hereinafter referred to as "FRA"), the procedure for the predeparture inspection and testing of air brake equipment (hereinafter "terminal test procedure") must be performed prior to departure of a train from a railyard terminal. The terminal test procedure includes an initial brake pipe leakage test followed by a brake application test and a brake release test.

Before the terminal test procedure can be performed, one or more locomotives are aligned on a railyard track with one or more railcars and coupled together to form what in the railroad industry is referred to as a train consist. The locomotives and the railcars not only must be physically coupled together but their air hoses must also be connected together to form what is called an air brake pipe. The air brake pipe is essentially a continuous pipe running from a head of train locomotive to a last railcar in the train consist. The continuous air brake pipe serves to supply the brakes of each vehicle in the train consist with the air pressure required for brake operation and for performance of the aforementioned brake pipe leakage, brake application and brake release tests.

The initial brake pipe leakage test of the terminal test procedure may be performed by either the Traditional Brake Pipe Drop Pressure Method or the more recently introduced Air Flow Method. Basically, the Traditional Brake Pipe Drop Pressure Method involves charging the brake pipe to within approximately 15 psi of a drop method setup pressure as measured at predefined points along the train consist. The brake pipe is sufficiently pressurized to apply the brakes on each railcar in the train consist. A prefigured full service reduction in the pressure within the brake pipe is then made. After listening for the exhaust from the brake pipe to stop so as to determine when the prefigured reduction has been achieved, a brake pipe cutoff valve is closed. Following a prespecified time during which the brake pipe pressure settles, the leakage from the brake pipe is monitored for one minute. Only if the leakage does not exceed 5 psi within the one minute period does the train consist pass the brake pipe leakage test.

The Air Flow Method essentially involves charging the brake pipe to within approximately 15 psi of an air flow method setup pressure as measured at predefined points along the train consist and so that the brake pipe pressure at the last railcar is greater than or equal to 75 psi. The brake pipe is sufficiently pressurized to apply the brakes on and each railcar in the train consist. The air flow within the brake pipe is measured. Only if the air flow is less than 60 cubic feet per minute does the train consist pass the brake pipe leakage test. No matter which method is performed, if the train consist fails the brake pipe leakage test, the source(s) of the excessive leakage must be located and repaired and the brake pipe leakage test repeated.

The brake application and release tests of the terminal test procedure have traditionally been labor intensive operations, generally requiring at least two railyard workers to perform. For example, beginning with the brake application test, a cab worker situated in a cab of the head of train locomotive manually applies the brakes of the train consist in response to the instructions of one or more other workers commonly (and hereinafter) referred to as maintainers located outside the train consist. The brakes are manually applied typically through a brake handle situated on a cab control unit located in the head of train locomotive. (Although one of the maintainers could climb into the cab to perform the brake handle manipulations, it is advisable that the brake controls be staffed during the terminal test procedure.) The maintainer(s) then walk the length of the train consist from the head of train locomotive to the last railcar inspecting the brake equipment of each locomotive and each railcar and visually verifying that the brakes have applied.

Nearly identical to the brake application test, the brake release test also generally requires at least two railyard workers to perform. The maintainer(s) return to the head of train locomotive to inform the cab worker to release the brakes. The cab worker manually releases the brakes through the brake handle. The maintainer(s) then again walk the length of the train consist inspecting the brake equipment of each railcar and each locomotive and visually verifying that the brakes have released. The maintainer(s) may then return to the head of train locomotive to inform the cab worker to reapply the brakes.

The inspection conducted during the brake application and release tests includes examination of the brake equipment including brake piston travel, brake shoes, brake cylinders, rigging and other brake system components. The brake application and release tests also entail listening for leaks from the brake system components and the hose couplings. Any and all problems revealed during the course of the inspection must be corrected prior to the departure of the train consist, except as allowed by the Power Brake Law.

The brake application and release tests thus require (1) the labor of at least two railyard workers (i.e., one in the cab to apply and release the brakes and one to walk the train to inspect, and verify application and release of, the brakes) and (2) generally, three trips by one or more workers between the head of train locomotive and the last railcar.

The present automated terminal test system substantially improves upon several existing components of a train consist. Generally, a typical head of train locomotive has a cab control unit, computer controlled brake equipment such as WABCO EPIC(R) Brake Equipment, cab integration equipment such as WABCO Cab Integration Equipment for controlling train operation, a cab keyboard for accessing the cab integration equipment, a cab display for monitoring train operation, a typical head of train device, and, possibly, a systems integrator such as Integrated Cab Electronics (ICE) made by General Motors Corporation or Integrated Function Control (IFC) made by General Electric Corporation. The cab control unit, the cab display, the cab keyboard and the brake equipment essentially comprise the cab integration equipment. Therefore, for the purposes of the present invention set forth below, communication to the cab integration equipment signifies communication to the brake equipment, the cab control unit and the cab display and vice versa. These elements, however, are herein generally set forth separately in terms of their function and interrelationship as basic foundation for the detailed description and claims to follow.

Referring still to the elements of the typical head of train locomotive, the cab control unit includes an automatic brake handle and an independent brake handle. The automatic brake handle permits the application and release of the brakes on each locomotive and each railcar in the train consist. The independent brake handle permits the application and release of the brakes on each locomotive in the train consist.

The typical head of train device is connected to and monitors the pressure within the brake pipe on the head of train locomotive. The typical head of train device also receives communications from a typical end of train device. The typical end of train device is connected to the brake pipe on a last railcar of the train consist. The typical end of train device monitors both the pressure within the brake pipe on the last railcar and the movement of the last railcar. The typical end of train device transmits the resulting last railcar brake pipe pressure data and the last railcar motion data to the typical head of train device.

In a standalone head of train locomotive (i.e., a head of train locomotive not equipped with the systems integrator), a train operator uses the cab keyboard to input various commands to the cab integration equipment so as to control the operation of the train. The parameters associated with train operation are monitored on the cab display. In a non-standalone head of train locomotive (i.e., one equipped with the systems integrator), the systems integrator essentially controls the cab integration equipment; the details of such control not being necessary to an understanding of the present invention. The systems integrator provides an integrator keyboard as a means for inputting the various commands to the cab integration equipment. The systems integrator provides an integrator display for monitoring the parameters associated with train operation. Consequently, in non-standalone locomotives, the inputting and monitoring functions are accomplished through the integrator keyboard and the integrator display, respectively, of the systems integrator rather than the cab keyboard and the cab display of the cab integration equipment.

In the standalone head of train locomotive, the typical head of train device relays to the cab integration equipment through a first communications link the last railcar brake pipe pressure data, the last railcar motion data and the head of train brake pipe pressure data. The cab integration equipment outputs such data to the cab display for monitoring by the train operator. Additionally, the cab integration equipment relays such data to the computer controlled brake equipment through a second communications link. The computer controlled brake equipment uses such data to control the application and release of the brakes of the train consist and to maintain proper brake pipe pressure.

In the non-standalone head of train locomotive, the typical head of train device relays to the systems integrator through a first integrator link the last railcar brake pipe pressure data, the last railcar motion data and the head of train brake pipe pressure data. The systems integrator outputs such data to the integrator display for monitoring by the train operator. In addition, the systems integrator relays such data to the computer controlled brake equipment through a second integrator link. The computer controlled brake equipment uses such data to control the application and release of the brakes of the train consist and to maintain proper brake pipe pressure.

It should be emphasized that in both standalone or non-standalone head of train locomotives the last railcar brake pipe pressure data, the last railcar motion data, and the head of train brake pipe pressure data will ultimately be relayed from the head of train device to the computer controlled brake equipment, part of the cab integration equipment.

It should be further noted that, in a train consist having either the standalone or the non-standalone head of train locomotive, an automated terminal test system of any type will still require the maintainer(s) to walk the length of the train consist for the purpose of inspecting the brake equipment and verifying application and release of the brakes. The present invention, however, both avoids the need for the cab worker as it gives the maintainer(s) control of the brakes from outside the train consist and reduces the number of walks the maintainer(s) must make between the head of train locomotive and the last railcar during the terminal test.

SUMMARY OF THE INVENTION

The present invention or related inventions provide an automated terminal test system for conducting a terminal test of brake equipment on a train consist. Such brake equipment is computer controlled and includes a brake, a brake pipe, and a brake valve connected to such brake pipe and controlled generally by such computer controlled brake equipment. In a first embodiment, the present system includes a test control box having a control. The test control box is connected to a head of train locomotive and is accessible from the outside of such train. The test control box is also linked to such computer controlled brake equipment so that when the test control box is activated through the control by a railyard worker such railyard worker may manipulate the control to apply and release such brake and to charge and vent such brake pipe. The first embodiment of the present invention also includes an end of train transceiver means and a head of train transceiver means. The end of train transceiver means is connected to such brake pipe on a last railcar of such train consist. The end of train transceiver means monitors the pressure within such brake pipe on such last railcar and senses the movement of such last railcar. The head of train transceiver means is linked to such computer controlled brake equipment and is connected to such brake pipe on such head of train locomotive. The head of train transceiver means monitors the pressure within such brake pipe on such head of train locomotive and transmits to such computer controlled brake equipment data pertaining to the pressure within such brake pipe on such head of train locomotive. The head of train transceiver means also relays to such computer controlled brake equipment data pertaining to both the pressure within such brake pipe on such last railcar and the movement of such last railcar both received from the end of train transceiver means. The first embodiment permits such railyard worker to apply and release such brake automatically and charge and vent such brake pipe automatically through such computer controlled brake equipment using the test control box. The first embodiment thereby avoids the need for a cab worker during the terminal test to apply and release such brake and charge and vent such brake pipe from a cab of such head of train locomotive in response to the instructions of such railyard worker situated outside of such train. In a first variation of this first embodiment, the test control box is mounted to an exterior of such head of train locomotive. In a second variation, the test control box is portable by virtue of a cable and a plug wherein the cable emerges from the test control box and connects at a terminal end to the plug. The plug inserts into a socket attached to such exterior of such head of train locomotive. The socket is connected to such computer controlled brake equipment so that when the plug is inserted into the socket, the test control box is linked to such computer controlled brake equipment thereby making the test control box portable.

In a presently preferred second embodiment, the present invention or related inventions provide a portable radio controller for conducting the terminal test of brake equipment on a train consist. Such brake equipment is computer controlled and includes a brake, a brake pipe, and a brake valve connected to such brake pipe and controlled generally by such computer controlled brake equipment. Such train consist has a head of train locomotive and such head of train locomotive has a cab control unit connected to such brake equipment. Such cab control unit includes an automatic brake handle for applying and releasing such brake on each locomotive and each railcar in such train consist and an independent brake handle for applying and releasing such brake on each locomotive in such train consist. Such automatic brake handle includes an emergency position wherein such automatic brake handle can not be rendered inoperable and such brake applies. The portable, radio controlled automated terminal test system also includes an end of train transceiver means and a head of train transceiver means. The end of train transceiver means is connected to such brake pipe on a last railcar of such train consist. The end of train transceiver means monitors the pressure within such brake pipe on such last railcar and senses the movement of such last railcar. The head of train transceiver means is linked to such computer controlled brake equipment and is connected to such brake pipe on such head of train locomotive. The head of train transceiver means monitors the pressure within such brake pipe on such head of train locomotive and transmits to such computer controlled brake equipment data pertaining to the pressure within such brake pipe on such head of train locomotive. The head of train transceiver means relays to such computer controlled brake equipment data pertaining to both the pressure within such brake pipe on such last railcar and the movement of such last railcar both received from the end of train transceiver means. The portable radio controller has a control and transmits a plurality of brake test signals to the head of train transceiver means. The head of train transceiver means herein also relays the brake test signals to such computer controlled brake equipment. The brake test signals include a terminal test mode activation signal for placing such computer controlled brake equipment into a terminal test mode. Such computer controlled brake equipment is placed into the terminal test mode when the portable radio controller is activated through the control by a railyard worker. Such automatic and independent brake handles are rendered inoperable while such computer controlled brake equipment operates in the terminal test mode so as to prevent interference with the terminal test. The brake test signals also include a brake leakage test signal for controlling the charging and venting of such brake pipe. The brake leakage test signal can be transmitted when such computer controlled brake equipment operates in the terminal test mode and such railyard worker manipulates the control to charge and vent such brake pipe. The brake test signals further include a brake application test signal for controlling the application of such brake. The brake application test signal can be transmitted when such computer controlled brake equipment operates in the terminal test mode and such railyard worker manipulates the control to apply such brake.

The brake test signals also include a brake release test signal for controlling the release of such brake. The brake release test signal can be transmitted when such computer controlled brake equipment operates in the terminal test mode and such railyard worker manipulates the control to release such brake. The presently preferred second embodiment permits such railyard worker to apply and release such brake automatically and charge and vent such brake pipe automatically through such computer controlled brake equipment using the portable radio controller. The presently preferred second embodiment thereby avoids the need for a cab worker during the terminal test to apply and release such brake and charge and vent such brake pipe from a cab of such head of train locomotive in response to the instructions of such railyard worker situated outside of such train consist.

The present invention or related inventions also provide an improved brake pipe drop method for performing a brake pipe leakage test of an automated terminal test procedure on a train consist prior to departure of such train consist from a railyard terminal. Such train consist includes a brake, a brake pipe, and a brake pipe cutoff valve. The method includes charging such brake pipe to within approximately 15 psi of a drop method setup pressure; applying such brake on each locomotive and each railcar in such train consist; making a prefigured psi reduction in pressure within such brake pipe; determining length of such train consist; and waiting for a predetermined time for such reduction in pressure to occur within such brake pipe wherein said predetermined time depends upon said length of such train consist. The method also includes closing such brake pipe cutoff valve after waiting said predetermined time thereby closing such brake pipe; waiting a prespecified time during which pressure within such brake pipe settles; monitoring leakage from such brake pipe for one minute; passing such train consist from such brake pipe leakage test only if such leakage does not exceed 5 psi during such one minute period; and locating and repairing source(s) of such excessive leakage if such train consist fails such brake pipe leakage test. The method further includes repeating such brake pipe leakage test after such source(s) of such excessive leakage have been located and repaired and until such train consist passes such brake pipe leakage test.

OBJECTIVE OF THE INVENTION

A primary objective of the present invention or related inventions is to provide an automated terminal test system for conducting a terminal test of brake equipment on a train consist.

Another objective of the present invention or related inventions is to provide an automated terminal test system that reduces both the amount of labor and the amount of time required to perform a terminal test of brake equipment on a train consist.

Yet another objective of the present invention or related inventions is to provide an automated terminal test system having a test control box mounted to an exterior of a locomotive of a train consist for conducting a terminal test of brake equipment on such train consist.

Still another objective of the present invention or related inventions is to provide an automated terminal test system having a portable test control box connectable to an exterior of a locomotive of a train consist for conducting a terminal test of brake equipment on such train consist.

A further objective of the present invention or related inventions is to provide an automated terminal test system including a portable radio controller for conducting a terminal test of brake equipment on a train consist.

Even another objective of the present invention or related inventions is to provide an automated terminal test system that allows control of the brakes of a train consist from outside such train consist thereby expediting maintenance including replacement of brake shoes and adjustments to brake control handles, hose couplings and rigging.

Still a further objective of the present invention or related inventions is to provide an improved end of train transceiver of a type which in addition to functions performed by typical end of train transceivers includes a brake release initiator upon activation of which the improved end of train transceiver transmits a brake release command signal.

Now a related further objective of the present invention or related inventions is to provide an improved head of train transceiver of a type which in addition to functions performed by typical head of train transceivers includes a means for receiving a brake release command signal and a means for relaying the brake release command signal to brake equipment of a train consist.

Yet a further objective of the present invention or related inventions is to provide an Improved Brake Pipe Drop Method for performing a brake pipe leakage test of an automated terminal test procedure on a train consist prior to departure from a railyard terminal.

In addition to the objectives and advantages described above, various other objectives and advantages of the present invention will become more readily apparent to those persons who are skilled in the train consist brake equipment art from the detailed description of the invention, particularly, when such description is taken in conjunction with the attached drawings and with the appended claims.

BRIEF DESCRIPTION OF THE DRAWINGS

FIG. 5 is a schematic block diagram of a train consist having a standalone locomotive according to a presently preferred second embodiment of the present invention.

FIG. 6 is a schematic block diagram of a train consist having a non-standalone locomotive according to the presently preferred second embodiment of the present invention.

DETAILED DESCRIPTION OF THE INVENTION

Figure 1:
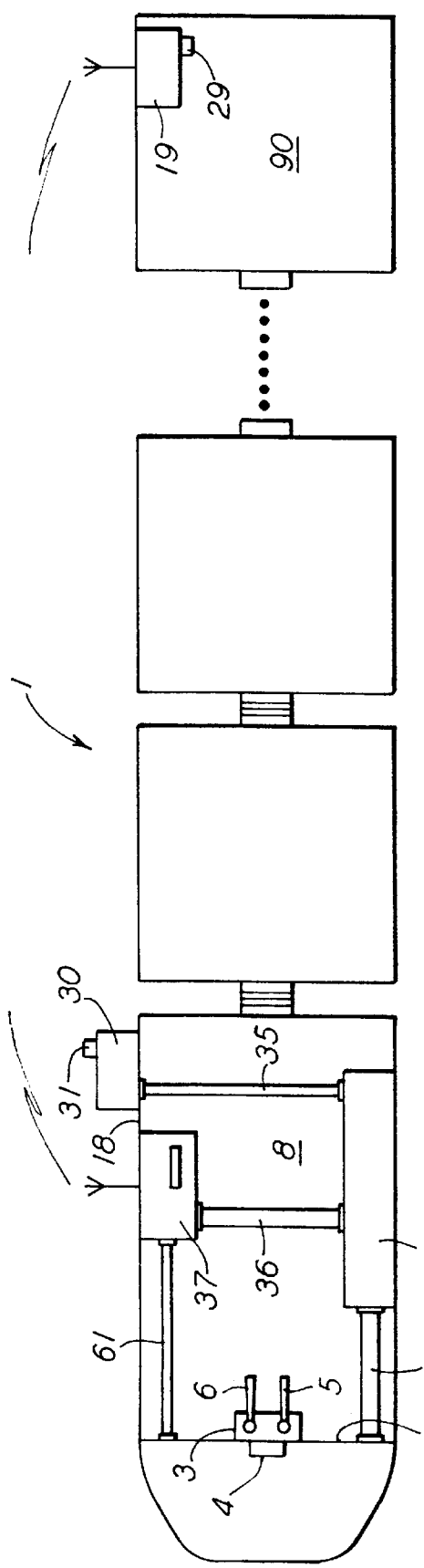
FIG. 1 is a schematic block diagram of a train consist having a standalone locomotive according to a first variation of a first embodiment of the present invention.

Prior to proceeding to the more detailed description of the various embodiments of the present invention, it should be noted that identical components having identical functions in each of the accompanying drawings have been identified with identical reference numerals throughout each of the several Figures illustrated herein.

Referring to FIGS. 1 through 6, illustrated in each are the essential details of an automated terminal test system for conducting a terminal test of brake equipment 2 on a train consist, generally designated 1. The brake equipment 2 is computer controlled and includes a brake pipe (not shown), a plurality of brakes (not shown and hereinafter simply referred to as "brake"), and a brake valve (not shown) connected to such brake pipe and controlled generally by such computer controlled brake equipment. Known to those persons skilled in the train consist brake equipment art and therefore not necessary to set forth in detail herein, it is sufficient background for the present invention to describe such brake pipe basically as a continuous pipe running from a head of train locomotive 8 to a last railcar 90 in such train consist 1.

Such head of train locomotive 8 generally includes such computer controlled brake equipment 2, a cab control unit 3 and a cab display 4. Such cab control unit 3 and such cab display 4 are connected to such computer controlled brake equipment 2. Such cab control unit 3 includes an automatic brake handle 5 for applying and releasing such brake on each locomotive and each railcar in such train consist 1 and an independent brake handle 6 for applying and releasing such brake on each locomotive in such train consist 1. Such automatic brake handle 5 has an emergency position (not shown) wherein such automatic brake handle 5 can not be rendered inoperable and such brake applies.

Refer now to a first embodiment of the present invention illustrated in FIGS. 1 through 4. In the first embodiment, the automated terminal test system basically includes an end of train transceiver 19, a head of train transceiver 37 and a test control box 30. The end of train transceiver 19 is connected to such brake pipe on such last railcar 90 of such train consist 1. The end of train transceiver 19 monitors the pressure within such brake pipe on such last railcar 90 and senses the movement of such last railcar 90. The end of train transceiver 19 transmits the resulting last railcar brake pipe pressure data and the last railcar motion data to the head of train transceiver 37. The head of train transceiver 37 is connected to and monitors the pressure within such brake pipe on such head of train locomotive 8.

Figure 3:
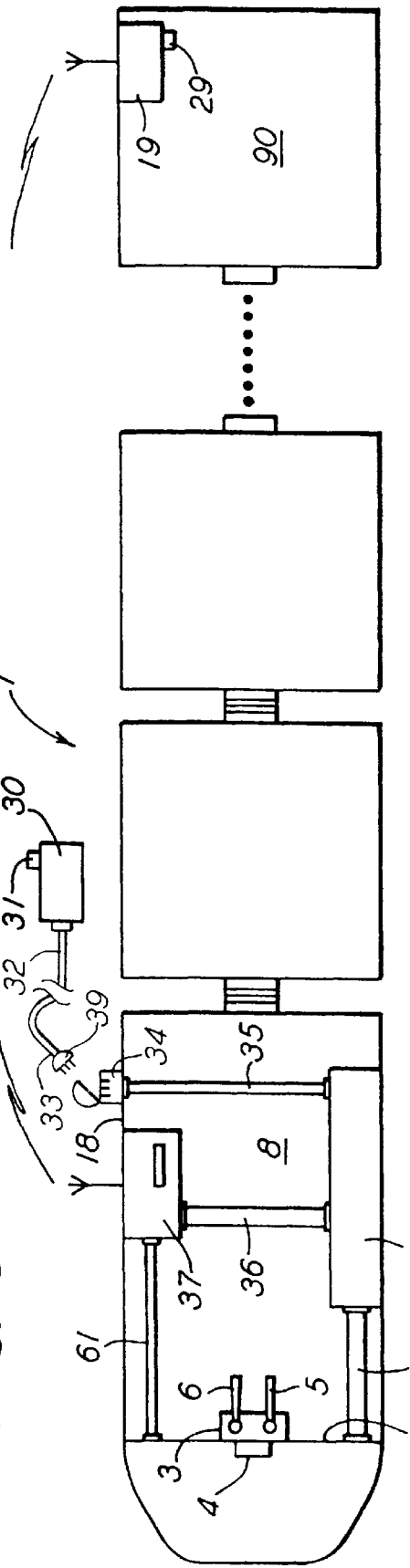
FIG. 3 is a schematic block diagram of a train consist having a standalone locomotive according to a second variation of the first embodiment of the present invention.

Refer now to FIGS. 1 and 3. Illustrated in each is such train consist 1 having such standalone type head of train locomotive 8 (i.e., without such heretofore described systems integrator). In such standalone locomotive, the head of train transceiver 37 relays to such cab integration equipment 7 through a first communications link 61 the last railcar brake pipe pressure data, the last railcar motion data and the head of train brake pipe pressure data. Such cab integration equipment 7 outputs such data to such cab display 4 for viewing by a train operator. In addition, such cab integration equipment 7, among other functions not pertinent to the instant invention, relays such data to such computer controlled brake equipment 2 through a second communications link 62. Such computer controlled brake equipment 2 uses such data to control the application and release of such brake of such train consist 1 and to maintain proper pressure in such brake pipe.

Figure 2:
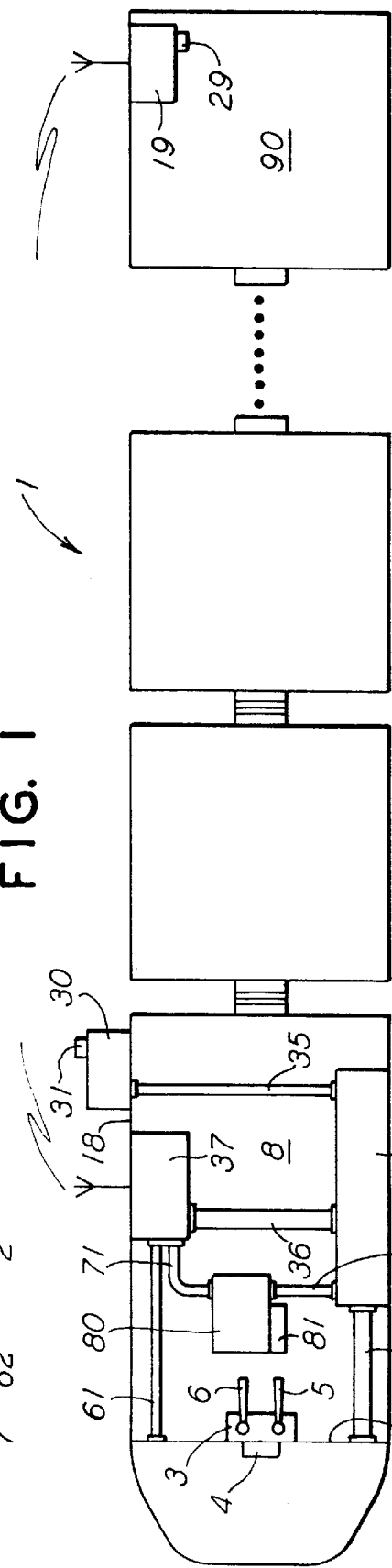
FIG. 2 is a schematic block diagram of a train consist having a non-standalone locomotive according to the first variation of the first embodiment of the present invention.
Figure 4:
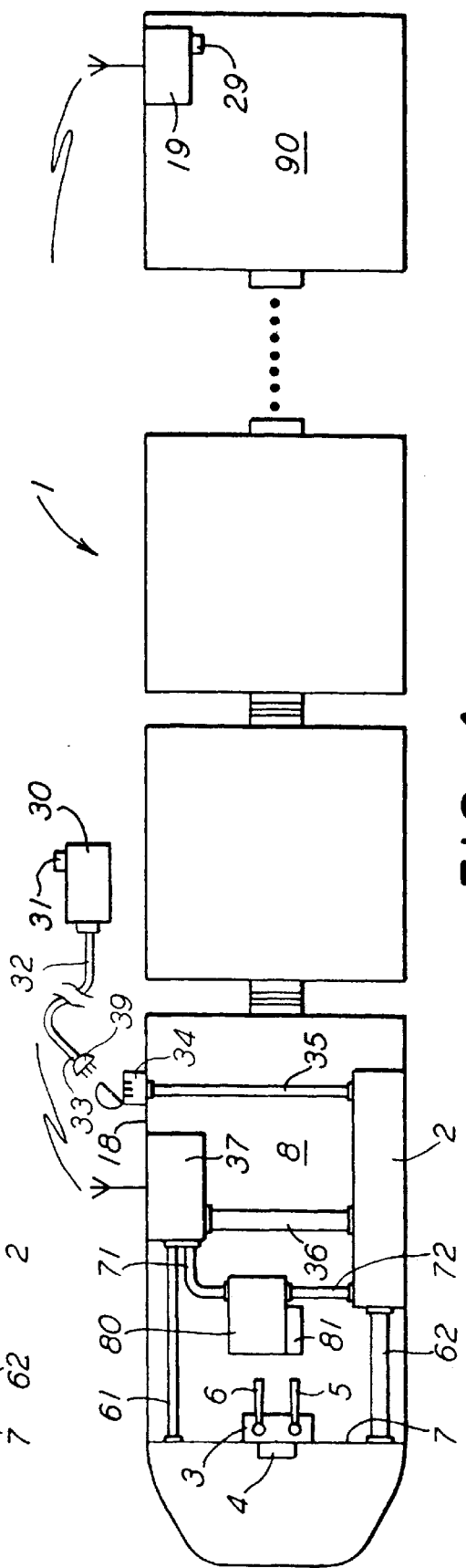
FIG. 4 is a schematic block diagram of a train consist having a non-standalone locomotive according to the second variation of the first embodiment of the present invention.

Referring now to FIGS. 2 and 4, in such non-standalone type head of train locomotive 8 (i.e., with such systems integrator), the head of train transceiver 37 relays to such systems integrator 80 through a first integrator link 71 the last railcar brake pipe pressure data, the last railcar motion data and the head of train brake pipe pressure data. Such systems integrator 80 outputs such data to such integrator display 81 for viewing by such train operator. In addition, such systems integrator 80, among other functions not pertinent to the instant invention, relays such data to such computer controlled brake equipment 2 through a second integrator link 72. Such computer controlled brake equipment 2 uses such data to control the application and release of such brake of such train consist 1 and to maintain proper pressure in such brake pipe.

Referring now to either FIGS. 1 and 3 depicting such standalone locomotive and FIGS. 2 and 4 depicting such non-standalone locomotive, the test control box 30 is connected to such head of train locomotive 8 and is accessible from the outside of such train consist 1. Through a new test link 35, the test control box 30 communicates with such computer controlled brake equipment 2. The new test link 35, for example, can be chosen to be an RS-422 or an RS-232 type link.

In a first variation of this first embodiment as illustrated in FIGS. 1 and 2, the connection of the test control box 30 to such head of train locomotive 8 involves mounting the test control box 30 to an exterior 18 of such head of train locomotive 8. In a second variation as shown in FIGS. 3 and 4, the connection takes the form of a cable, plug and socket coupling. A cable 32 emerges from the test control box 30 and connects at a terminal end 39 of the cable 32 to a plug 33. The plug 33 inserts into a socket 34 attached to such exterior 18 of such head of train locomotive 8. The socket 34 is linked to such computer controlled brake equipment 2 though the new test link 35 so that when the plug 33 is inserted into the socket 34, the test control box 30 is linked to such computer controlled brake equipment 2. The latter variation thus endows the test control box 30 with a degree of portability. In either variation, the test control box 30 is linked to such computer controlled brake equipment 2 through the new test link 35.

Referring now to either FIGS. 1 and 3 depicting such standalone locomotive and FIGS. 2 and 4 depicting such non-standalone locomotive, the test control box 30 includes one or more controls 31 (hereinafter referred to as "control"). Through the control 31 on the test control box 30, a railyard worker can initiate each test of a terminal test procedure in any order. The terminal test procedure entails an initial brake pipe leakage test followed by a brake application test and a brake release test. Each test of the terminal test procedure must be performed on such brake equipment 2 on such train consist 1 prior to departure of such train consist 1 from a railyard terminal.

When such railyard worker activates the test control box 30 through the control 31, the test control box 30 communicates through the new test link 35 with such computer controlled brake equipment 2 placing such computer controlled brake equipment 2 in a TERMINAL TEST MODE. While such computer controlled brake equipment 2 is operated in the TERMINAL TEST MODE, such automatic and independent brake handles 5,6 are rendered inoperable to prevent interference with the terminal test in progress. Note, however, that if an emergency arises at any time during the terminal test, such automatic brake handle 5 can be moved into such emergency position thereby applying such brake on each locomotive and each railcar on such train consist 1.

Once the test control box 30 is so activated, such railyard worker may commence the initial brake pipe leakage test by manipulating the control 31 (e.g., by moving the control 31 into a brake leakage test position). Through the new test link 35, the test control box 30 commands such computer controlled brake equipment 2 to charge such brake pipe. Such computer controlled brake equipment 2 charges such brake pipe to a setup pressure appropriate to the method of brake pipe leakage test chosen to be performed, either an Improved Brake Pipe Drop Method (hereinafter described) or the Air Flow Method (heretofore described). Such brake pipe is sufficiently pressurized on each vehicle in such train consist 1. The leakage from such brake pipe is monitored. Only if the leakage does not exceed the limits proscribed by whichever of such leakage test methods is chosen does such train consist pass the brake pipe leakage test. No matter which method is performed, if the train consist fails the brake pipe leakage test, the source(s) of the excessive leakage must be located and repaired and the brake pipe leakage test repeated.

After the brake pipe leakage test has been successfully performed, such railyard worker may commence the brake application test by manipulating the control 31 (e.g., by moving the control 31 into a brake application position). Through the new test link 35, the test control box 30 commands such computer controlled brake equipment 2 to apply such brake on such train consist 1. Such railyard worker then performs a front to rear check of such brake equipment 2 of such train consist 1. Specifically, such railyard worker walks from such head of train locomotive 8 to such last railcar 90 (or to an end of train locomotive, not shown, if the last vehicle of such train consist 1 is a locomotive) inspecting such brake equipment 2 and verifying visually that such brake of each locomotive and each railcar has applied. The inspection of such brake equipment 2 includes examination of brake piston travel, brake cylinders, brake shoes, rigging and other brake system components (not shown) and listening for leaks from such brake components and hose couplings.

Brake piston travel, for example, must be maintained within specified limits. If such railyard worker observes that such brake piston travel exceeds such limits, such brake piston travel must be adjusted accordingly. Such brake pistons, of course, are located within such brake cylinders and therefore are not visible. Brake piston travel, however, may be observed by such railyard worker during the inspection of such brake equipment.

If upon inspection such railyard worker determines that such brake has applied on each locomotive and each railcar in such train consist 1 and that such brake equipment 2 is in proper working condition, such train consist 1 has passed the brake application test. If on the other hand such railyard worker determines that such brake has not applied on each locomotive and each railcar in such train consist 1, that such brake equipment 2 is not in proper working condition and/or that there is leakage from such brake component(s) or hose couplings, such train consist 1 has failed the brake application test. In the event that such train consist 1 fails, whatever problems were revealed during the course of the brake application test must be corrected.

After successful completion of the brake application test, such railyard worker may perform the brake release test. Similar to the brake application test, with the test control box 30 activated through the control 31 thereby placing such computer controlled brake equipment 2 into the TERMINAL TEST MODE, the test control box 30 is ready for the brake release test portion of the terminal test procedure. With the test control box 30 activated, such railyard worker commences the brake release test by manipulating the control 31 (e.g., by moving the control 31 into a brake release position). Through the new test link 35, the test control box 30 commands such computer controlled brake equipment 2 to release such brake on such train consist 1. Such railyard worker then performs a rear to front check of such brake equipment 2 of such train consist 1. Specifically, such railyard worker walks from such last railcar 90 to such head of train locomotive 8 inspecting such brake equipment 2 and verifying visually that such brake of each locomotive and each railcar has released.

If upon inspection such railyard worker determines that such brake has released on each locomotive and each railcar in such train consist 1 and that such brake equipment 2 is in proper working condition, such train consist 1 has passed the brake release test. If on the other hand such railyard worker determines that such brake has not released on each locomotive and each railcar in such train consist 1, that such brake equipment 2 is not in proper working condition and/or that there is leakage from such brake component(s) or hose couplings, such train consist 1 has failed the brake release test. In the event that such train consist 1 fails, whatever problems were revealed during the course of the brake release test must be corrected. Such train consist 1 must pass both the brake application and brake release tests prior to departure from such railyard terminal.

As noted previously, the brake application test involves a front to rear check of such brake equipment 2 of such train consist 1. When the brake application test has been completed, such railyard worker ends up located at such rear of such train consist 1. Referring now specifically to the first variation of this first embodiment as illustrated in FIGS. 1 and 2, the test control box 30 is mounted to such exterior 18 of such head of train locomotive 8. This first variation requires such railyard worker to return to such front of such train consist 1 to the test control box 30 in order to commence the brake release test portion of the terminal test procedure. Such railyard worker must then make a second front to rear inspection of such brake equipment 2, this time to verify brake release. After verifying brake release, such railyard worker must yet again return to such front whereat such railyard worker may deactivate the test control box 30 through the control 31.

In train consists of relatively modest length, however, the second variation of this first embodiment eliminates the need for one of the return trips to such front of such train consist 1. Referring specifically to FIGS. 3 and 4, the portable nature of the cable, plug, and socket design of the second variation allows the test control box 30 to be carried during the front to rear check of such brake equipment 2 during the brake application test. After the brake application test has been successfully completed, such railyard worker can immediately commence the brake release test simply by manipulating the control 31 on the portable test control box 30. Such railyard worker then proceeds to perform the rear to front check of such brake equipment 2 during the brake release test. The distance that the test control box 30 can be carried, however, is limited by the length of the cable 32. The length of the cable 32 is, of course, dependent upon the length of the train consist 1 to be tested.

Alternatively, a track cable (not shown) could be permanently installed along such railyard track. For example, the track cable could have a tap (not shown) disposed every 1000 feet or so along its length. A jumper (not shown) could then be used to connect the track cable through one of the taps to the socket 34 attached to such exterior 18 of such head of train locomotive 8. The cable 32 of the test control box 30 could take the form of a flex lead to which the plug 39 attaches to the terminal end 39 thereof. The plug 39 could then be plugged into one of the taps thereby establishing a connection between the test control box 30 to and through the socket 34 to such computer controlled brake equipment 2.

It should be apparent to persons skilled in the train consist brake equipment art that many variations on the cable, plug, and socket design are possible and therefore not necessary to set forth in detail herein.

An added feature of the present invention is that the brake release test may be initiated not only from the test control box 30 but also from a brake release initiator 29 located on the end of train transceiver 19. As explained in the preceding paragraphs, a typical end of train device monitors and transmits to a typical head of train device last railcar brake pipe pressure data and last railcar motion data. The end of train transceiver 19 of the present invention, however, not only performs the above listed tasks but also transmits a brake release command signal (not shown) to the head of train transceiver 37 when such railyard worker activates the brake release initiator 29. The brake release initiator 29 may take the form of a manual input such as push button switch, a rotary switch, a lever, or like device.

In such train consist 1 having such standalone type head of train locomotive 8 as shown in FIGS. 1 and 3, the head of train transceiver 37 of the present invention receives the brake release command signal and relays same through a brake link 36 to such computer controlled brake equipment 2. Such computer controlled brake equipment 2 in response then releases such brake on each locomotive and each railcar in such train consist 1. The brake release initiator 29 thus gives such railyard worker another means to release such brake automatically. The head of train transceiver 37 also relays the brake release command signal to such cab integration equipment 7 through a modified first communications link 61. Originally for relaying such last railcar brake pipe pressure and motion data and such head of train brake pipe pressure data, such first communications link 61 is modified in the present invention to allow communication of the brake release command signal to such cab integration equipment 7. Such cab integration equipment 7 outputs such data to such cab display 4 for viewing by such train operator.

In such train consist 1 having such non-standalone type head of train locomotive 8 as shown in FIGS. 2 and 4, the head of train transceiver 37 relays the brake release command signal through the brake link 36 to such computer controlled brake equipment 2 for release of such brake on each locomotive and each railcar. The head of train transceiver 37 also relays the brake release command signal to such systems integrator 80 through a modified first integrator link 71. Originally for relaying such last railcar brake pipe pressure and motion data and such head of train brake pipe pressure data, such first integrator link 71 is modified in the present invention to allow communication of the brake release command signal to such systems integrator 80. Such systems integrator 80 outputs such data to such integrator display 81 for viewing by such train operator and to such cab integration equipment 7 for controlling the operation of such train consist 1.

The brake release initiator 29 thus allows such railyard worker optionally to release such brake automatically from such rear of such train consist 1 without having to ambulate from such rear to such head of train locomotive 8 to the test control box 30.

It should be noted that although the brake release initiator 29 may be best used with the mounted test control box 30 as envisioned in the first variation of this first embodiment, it can also be used in concert with the second variation. As indicated in FIGS. 3 and 4, such railyard worker would have the option of initiating the brake release test from either the portable test control box 30 or from the brake release initiator 29. The brake release initiator 29 would, of course, be the preferred option for extremely long train consists.

Referring again to both FIGS. 1 and 3 and as described in the foregoing paragraphs, in such standalone locomotive such cab display 4 is connected to such computer controlled brake equipment 2 through such second communications link 62. A typical cab display displays a plurality of information including such brake pipe pressure data generated by the head of train and the end of train transceivers 37,19 and such last railcar motion data generated by the end of train transceiver 19. Such cab display 4 herein displays not only the above listed information but also an indication of activation of the brake release initiator 29 of the end of train transceiver 19 and a terminal test mode message when such computer controlled brake equipment 2 is operated in the TERMINAL TEST MODE. The terminal test mode message and the brake release indication are displayed on such cab display 4 as a warning to any other railyard workers that such brake equipment 2 is operating in the TERMINAL TEST MODE.

Likewise, in such non-standalone locomotive as shown in FIGS. 2 and 4, such integrator display 81 is connected to such computer controlled brake equipment 2 through such second integrator link 72. A typical integrator display displays such plurality of information. Such integrator display 81 herein displays not only such information but also the indication of activation of the brake release initiator 29 and the terminal test mode message when such computer controlled brake equipment 2 is operated in the TERMINAL TEST MODE. Display of the terminal test mode message and the brake release indication warns such other railyards workers that such brake equipment 2 is operating in the TERMINAL TEST MODE.

Referring now to a presently preferred second embodiment illustrated in FIGS. 5 and 6, the present automated terminal test system includes a portable radio controller 40 for conducting the terminal test of such brake equipment 2 on such train consist 1. The presently preferred embodiment basically includes an end of train transceiver 19, a head of train transceiver 47 and the portable radio controller 40. The end of train transceiver 19 is connected to such brake pipe on such last railcar 90 of such train consist 1. The end of train transceiver 19 monitors the pressure within such brake pipe on such last railcar 90 and senses the movement of such last railcar 90. The end of train transceiver 19 transmits the resulting last railcar brake pipe pressure data and last railcar motion data to the head of train transceiver 47. The head of train transceiver 47 is connected to and monitors the pressure within such brake pipe on such head of train locomotive 8.

Refer now to FIG. 5. Therein illustrated is such train consist 1 having such standalone type head of train locomotive 8 (i.e., without such heretofore described systems integrator). In such standalone locomotive, the head of train transceiver 47 relays to such cab integration 7 through a first communications link 61 the last railcar brake pipe pressure data, the last railcar motion data and the head of train brake pipe pressure data. Such cab integration equipment 7 outputs such data to such cab display 4 for viewing by a train operator. In addition, such cab integration equipment 7, among other functions not pertinent to the instant invention, relays such data to such computer controlled brake equipment 2 through a second communications link 62. Such computer controlled brake equipment 2 uses such data to control the application and release of such brake of such train consist 1 and to maintain proper pressure in such brake pipe.

Referring now to FIG. 6, in such non-standalone type head of train locomotive 8 (i.e., with such systems integrator), the head of train transceiver 47 relays to such systems integrator 80 through a first integrator link 71 the last railcar brake pipe pressure data, the last railcar motion data and the head of train brake pipe pressure data. Such systems integrator 80 outputs such data to such integrator display 81 for viewing by such train operator. In addition, such systems integrator 80, among other functions not pertinent to the instant invention, relays such data to such computer controlled brake equipment 2 through a second integrator link 72. Such computer controlled brake equipment 2 uses such data to control the application and release of such brake of such train consist 1 and to maintain proper pressure in such brake pipe.

Referring now to either FIG. 5 or 6, in such train consist 1 having such standalone or such non-standalone locomotives, the portable radio controller 40 transmits to the head of train transceiver 47 a plurality of brake test signals (not shown). The plurality of brake test signals include: a terminal test mode activation signal; a brake leakage test signal; a brake application test signal; and a brake release test signal. Through a new relay link 42 such as an RS-422 or RS-232 type link, the head of train transceiver 47 of the present invention relays the brake test signals to such computer controlled brake equipment 2 so that the portable radio controller 40 controls the application and release of such brake through such computer controlled brake equipment 2.

Referring still to FIGS. 5 and 6, the portable radio controller 40 includes one or more controls 41 (hereinafter referred to as "control"). Through the control 41 on the portable radio controller 40, such railyard worker can initiate each test of the terminal test procedure. When such railyard worker activates the portable radio controller 40 through the control 41, the portable radio controller 40 immediately communicates with such computer controlled brake equipment 2 thereby placing such computer controlled brake equipment 2 in a TERMINAL TEST MODE. Specifically, upon activation, the portable radio controller 40 transmits the terminal test mode activation signal to the head of train transceiver 47. Through the new relay link 42, the head of train transceiver 47 relays the terminal test mode activation signal to such computer controlled brake equipment 2.

While such computer controlled brake equipment 2 is operated in the TERMINAL TEST MODE, such automatic and independent brake handles 5,6 are rendered inoperable to prevent interference with the terminal test in progress. Note, however, that if an emergency arises at any time during the terminal test, such automatic brake handle 5 can be moved into such emergency position thereby applying such brake on each locomotive and each railcar on such train consist 1.

Once the portable radio controller 40 is so activated, such railyard worker may commence the initial brake pipe leakage test by manipulating the control 41 (e.g., by moving the control 31 into a brake leakage test position). The portable radio controller 40 transmits the brake leakage test signal to the head of train transceiver 47. Through the new relay link 42, the head of train transceiver 47 relays the brake leakage test signal to such computer controlled brake equipment 2. Such computer controlled brake equipment 2 charges such brake pipe to a setup pressure appropriate to the type of brake pipe leakage test chosen to be performed, either an Improved Brake Pipe Drop Method (hereinafter described) or the Air Flow Method (heretofore described). Such brake pipe is sufficiently pressurized on each vehicle in such train consist 1. The leakage from such brake pipe is monitored. Only if the leakage does not exceed the limits proscribed by whichever of such leakage test methods is chosen does such train consist pass the brake pipe leakage test. No matter which method is performed, if the train consist fails the brake pipe leakage test, the source(s) of the excessive leakage must be located and repaired and the brake pipe leakage test repeated.

After the brake pipe leakage test has been successfully performed, such railyard worker may commence the brake application test by manipulating the control 41 to apply such brake on such train consist 1 (e.g., by moving the control 41 into a brake application position). The portable radio controller 40 transmits the brake application test signal to the head of train transceiver 47. Through the new relay link 42, the head of train transceiver 47 relays the brake application test signal to such computer controlled brake equipment 2. Once such brake applies, such railyard worker performs a front to rear check of such brake equipment 2 of such train consist 1. Specifically, such railyard worker walks from such head of train locomotive 8 to such last railcar 90 (or to an end of train locomotive, not shown, if the last vehicle of such train consist 1 is a locomotive) inspecting such brake equipment 2 and verifying visually that such brake of each locomotive and each railcar has applied.

If upon inspection such railyard worker determines that such brake has applied on each locomotive and each railcar in such train consist 1 and that such brake equipment 2 is in proper working condition, such train consist 1 has passed the brake application test. If on the other hand such railyard worker determines that such brake has not applied on each locomotive and each railcar in such train consist 1, that such brake equipment 2 is not in proper working condition and/or that there is leakage from such brake component(s) or hose couplings, such train consist 1 has failed the brake application test. In the event that such train consist 1 fails, whatever problems were revealed during the course of the brake application test must be corrected.

After successful completion of the brake application test, such railyard worker may perform the brake release test. With the portable radio controller 40 activated and the computer controlled brake equipment 2 placed in the terminal test mode, such railyard worker commences the brake release test by manipulating the control 41 to release such brake on such train consist 1 (e.g., by moving the control 41 into a brake release position). The portable radio controller 40 then transmits the brake release test signal to the head of train transceiver 47. Through the new relay link 42, the head of train transceiver 47 relays the brake release test signal to such computer controlled brake equipment 2. Once such brake releases, such railyard worker performs a rear to front check of such brake equipment 2 of such train consist 1. Specifically, such railyard worker walks from such last railcar 90 to such head of train locomotive 8 inspecting such brake equipment 2 and verifying visually that such brake of each locomotive and each railcar has released.

If upon inspection such railyard worker determines that such brake has released on each locomotive and each railcar in such train consist 1 and that such brake equipment 2 is in proper working condition, such train consist 1 has passed the brake release test. If on the other hand such railyard worker determines that such brake has not released on each locomotive and each railcar in such train consist 1, that such brake equipment 2 is not in proper working condition and/or that there is leakage from such brake component(s) or hose couplings, such train consist 1 has failed the brake release test. In the event that such train consist 1 fails, whatever problems were revealed during the course of the brake release test must be corrected. Such train consist 1 must pass both the brake application and brake release tests prior to departure from such railyard terminal.

An optional feature of the present invention is that the brake release test may be initiated not only from the portable radio controller 40 but also from a brake release initiator 29 located on the end of train transceiver 19. As explained in the preceding paragraphs, a typical end of train device monitors and transmits to a typical head of train device such last railcar brake pipe pressure data and such last railcar motion data. The end of train transceiver 19 of the present invention, however, not only performs the above listed tasks but also transmits a brake release command signal (not shown) to the head of train transceiver 47 when such railyard worker activates the brake release initiator 29. The brake release initiator 29 may take the form of a manual input such as push button switch, a rotary switch, a lever, or like device.

In such train consist 1 having such standalone type head of train locomotive 8 as shown in FIG. 5, the head of train transceiver 47 of the present invention receives the brake release command signal and relays same through the new relay link 42 to such computer controlled brake equipment 2. Such computer controlled brake equipment 2 in response then releases such brake on each locomotive and each railcar in such train consist 1. The brake release initiator 29 thus gives such railyard worker another means to release such brake automatically. The head of train transceiver 47 also relays the brake release command signal to such cab integration equipment 7 through a modified first communications link 61. Originally for relaying such last railcar brake pipe pressure and motion data and such head of train brake pipe pressure data, such first communications link 61 is modified in the present invention to allow communication of the brake release command signal to such cab integration equipment 7. Such cab integration equipment 7 outputs such data to such cab display 4 for viewing by such train operator.

In such train consist 1 having such non-standalone type head of train locomotive 8 as shown in FIG. 6, the head of train transceiver 47 relays the brake release command signal through the new relay link 42 to such computer controlled brake equipment 2 for release of such brake on each locomotive and each railcar. The head of train transceiver 47 also relays the brake release command signal to such systems integrator 80 through a modified first integrator link 71. Originally for relaying such last railcar brake pipe pressure and motion data and such head of train brake pipe pressure data, such first integrator link 71 is modified in the present invention to allow communication of the brake release command signal to such systems integrator 80. Such systems integrator 80 outputs such data to such integrator display 81 for viewing by such train operator and to such cab integration equipment 7 for controlling the operation of such train consist 1.

Referring again to FIG. 5, in such standalone locomotive such cab display 4 is connected to such computer controlled brake equipment 2 through such second communications link 62. A typical cab display displays a plurality of information including such brake pipe pressure data generated by the head of train and the end of train transceivers 47,19 and such last railcar motion data generated by the end of train transceiver 19. Such cab display 4 herein displays not only the above listed information but also an indication of activation of the brake release initiator 29 of the end of train transceiver 19 and a terminal test mode message when such computer controlled brake equipment 2 is operated in the TERMINAL TEST MODE. The terminal test mode message and the brake release indication are displayed on such cab display 4 as a warning to any other railyards workers that such brake equipment 2 is operating in the TERMINAL TEST MODE.

Likewise, in such non-standalone locomotive as shown in FIG. 6, a typical integrator display displays such plurality of information. Such integrator display 81 herein displays not only such information but also the indication of activation of the brake release initiator 29 and the terminal test mode message when such computer controlled brake equipment 2 is operated in the TERMINAL TEST MODE. Display of the terminal test mode message and the brake release indication warns such other railyard workers that such brake equipment 2 is operating in the TERMINAL TEST MODE.

It should be noted that in some railyard terminals and in some circumstances, it may be desirable to incorporate within the end of train transceiver 19 presented herein a brake application initiator (not shown) and/or a brake leakage test initiator (not shown). Such an upgraded end of train transceiver would provide such railyard worker with the option to initiate the brake pipe leakage test and the brake application test from such rear of such train consist 1. Consequently, the end of train transceiver 19 would have to be upgraded to include a means for transmitting a plurality of brake initiator signals to the head of train transceivers 47,37 presented herein. The plurality of brake initiator signals includes the brake release command signal, a brake application command signal and a brake leakage test command signal. The head of train transceivers 47 and 37 would likewise have to be upgraded to include a means for receiving the plurality of brake initiator signals transmitted from the upgraded end of train transceiver.

In such standalone locomotive of the first embodiment as shown in FIGS. 1 and 3, the modified first communication link 61 and the brake link 36 would have to be upgraded to allow communication of both the brake application and the brake leakage test command signals from the upgraded head of train transceiver to such cab integration equipment 7 and such brake equipment 2, respectively. In such standalone locomotive of the presently preferred second embodiment as shown in FIG. 5, the modified first communication link 61 and the new relay link 42 would have to be similarly upgraded.

Likewise, in such non-standalone locomotive of the first embodiment as shown in FIGS. 2 and 4, the modified first integrator link 71 and the brake link 36 would have to be upgraded to allow communication of both the brake application and the brake leakage test command signals from the upgraded head of train transceiver to such systems integrator 80 and such brake equipment 2, respectively. In such non-standalone locomotive of the presently preferred second embodiment as shown in FIG. 6, the modified first integrator link 71 and the new relay link 42 would have to be similarly upgraded.

Given the upgraded end of train and head of train transceivers, in such standalone and non-standalone locomotives of the first embodiment illustrated in FIGS. 1 through 4, it should also be noted that the brake link 36 generally constitutes a means for relaying the plurality of brake initiator signals. Similarly, in such standalone and non-standalone locomotives of the presently preferred second embodiment illustrated in FIGS. 5 and 6, the new relay link 42 generally constitutes the means for relaying the plurality of brake initiator signals.

For both embodiments of the instant invention herein presented, it should also be noted that for security and safety purposes each end of train transceiver would require a unique identifier code which only each subject head of train transceiver would be set up to recognize. This is the same identification protocol presently required for communication between typical head of train and typical end of train devices.

Likewise, each portable radio controller 40 would require a unique identifier code which only each subject head of train transceiver would be set up to recognize.

Figure 7A:
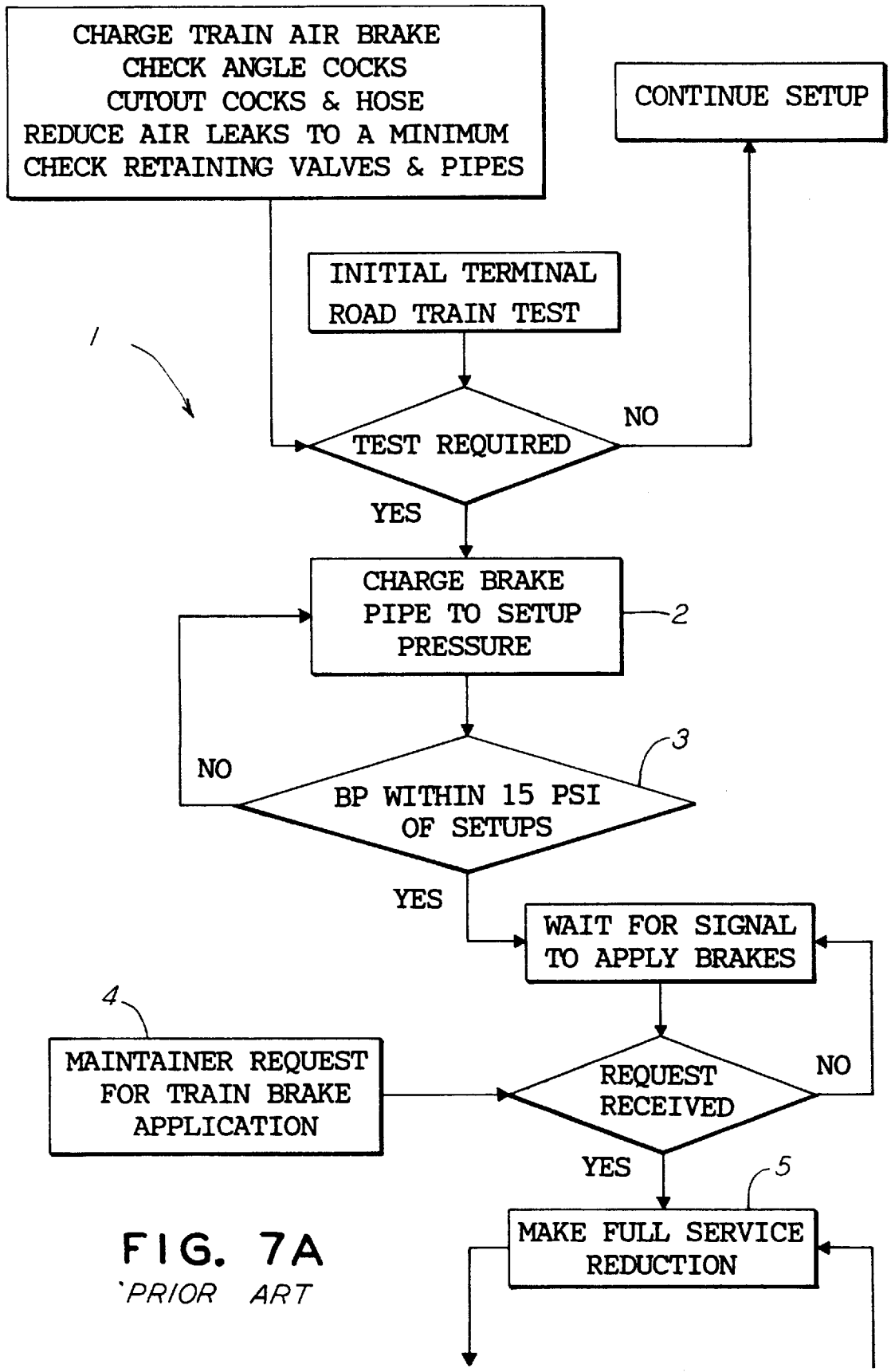
FIG. 7 is a block diagram of a Traditional Brake Pipe Drop Pressure Method for performing a brake pipe leakage test of a terminal test procedure on a train consist prior to departure from a railyard terminal.
Figure 7B:
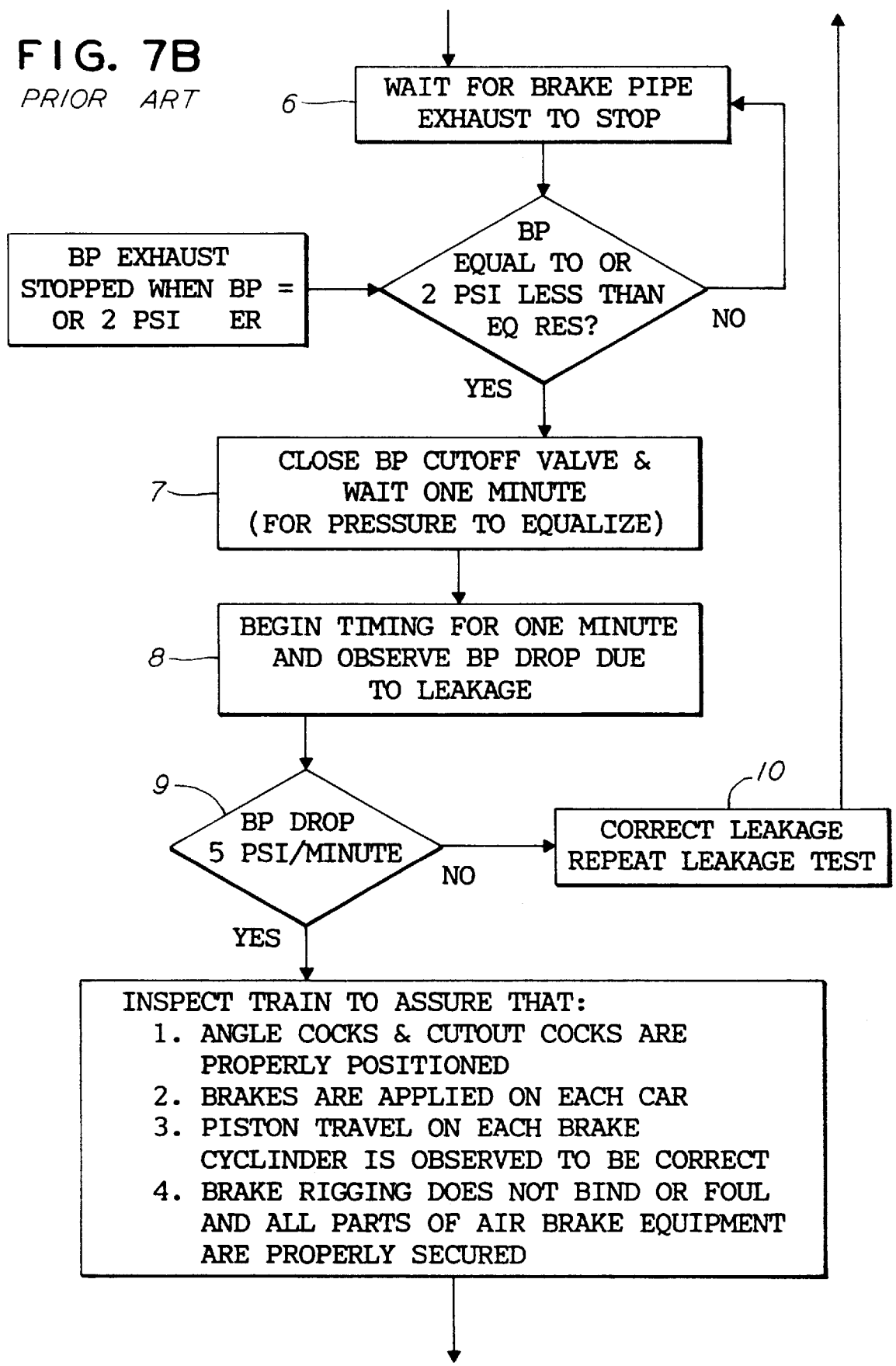
Figure 7C:
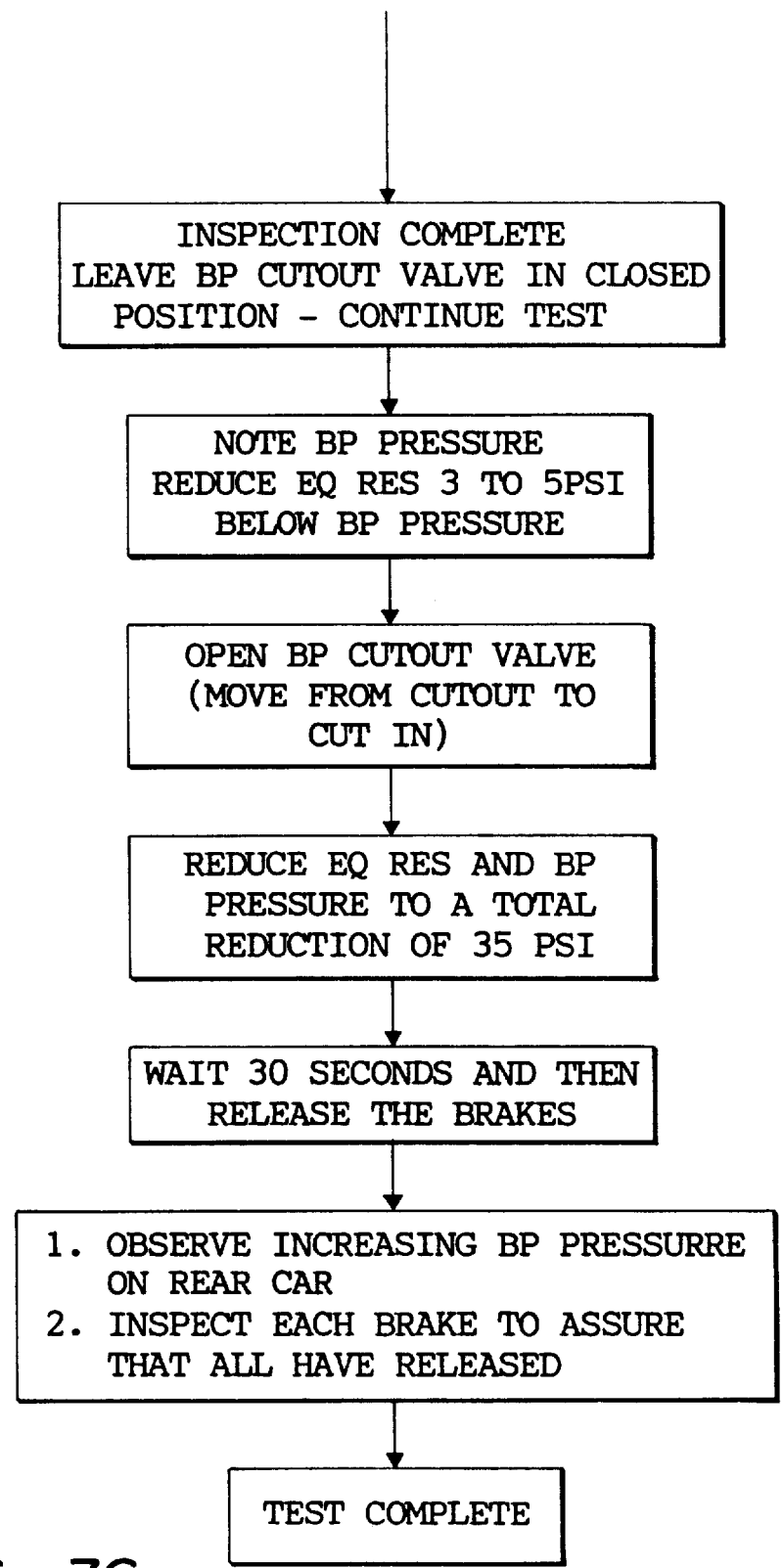

Referring now to FIG. 7, illustrated therein is the Traditional Brake Pipe Drop Pressure Method, generally designated 1, for performing the initial brake pipe leakage test of the terminal test procedure. The Traditional Brake Pipe Drop Pressure Method essentially involves charging 2 the brake pipe to within approximately 15 psi of a drop method setup pressure as measured at predefined points along such train consist. Once such brake has been applied 4 on each locomotive and each railcar in such train consist, a prefigured psi full service reduction 5 in the pressure within such brake pipe is then made. After listening for exhaust from such brake pipe to stop 6 so as to determine when the prefigured reduction has been achieved, a brake pipe cutoff valve is closed 7. Following a prespecified time during which such brake pipe pressure settles 7, the leakage from such brake pipe is monitored for one minute 8. Only if the leakage does not exceed 5 psi within the one minute period 9 does such train consist pass the brake pipe leakage test. If such train consist fails the brake pipe leakage test, the source(s) of the excessive leakage must be located and repaired 10 and the brake pipe leakage test repeated 10.

Figure 8A:
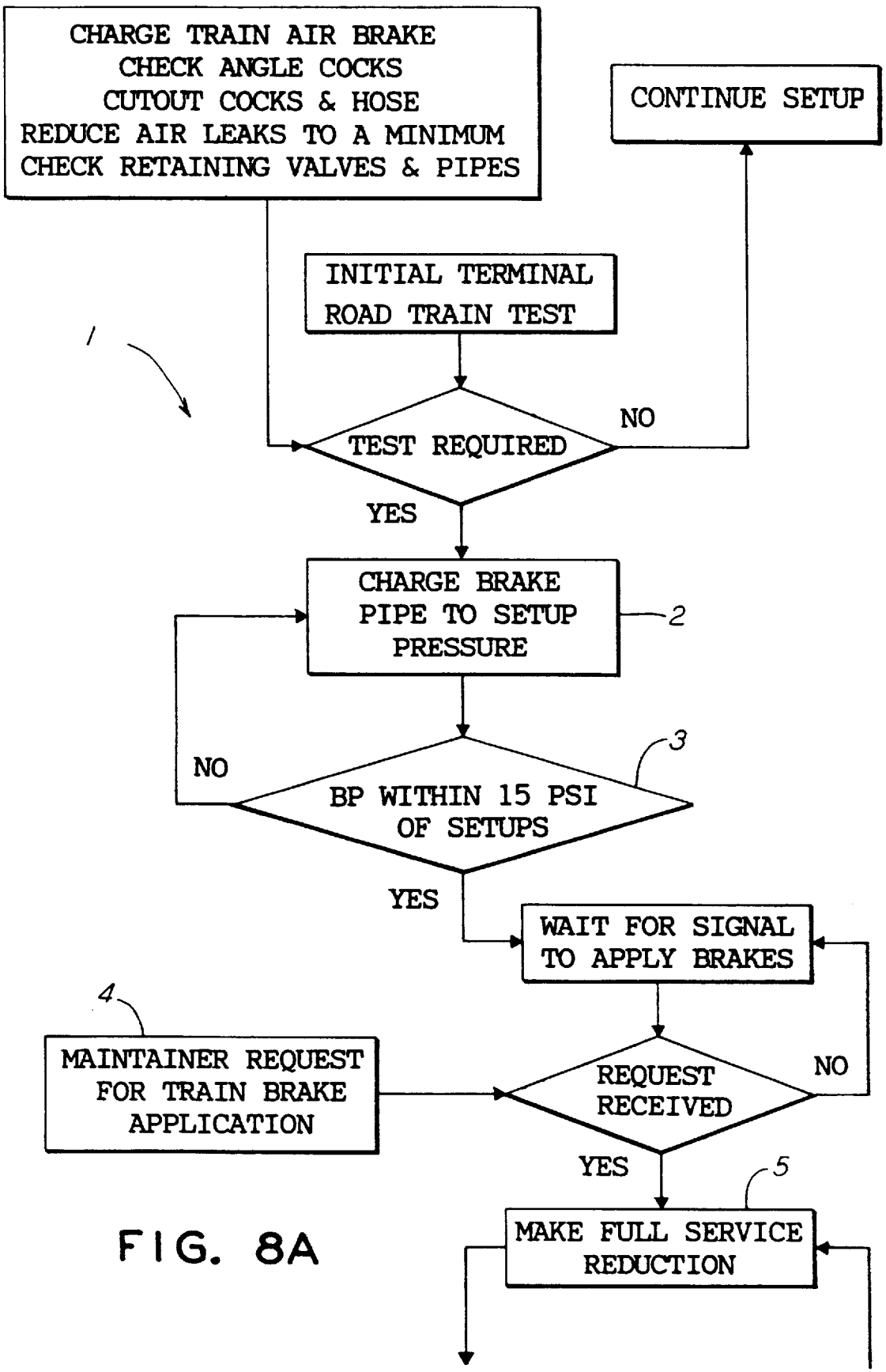
FIG. 8 is a block diagram of an Improved Brake Pipe Drop Pressure Method for performing a brake pipe leakage test of an automated terminal test procedure on a train consist prior to departure from a railyard terminal.
Figure 8C:
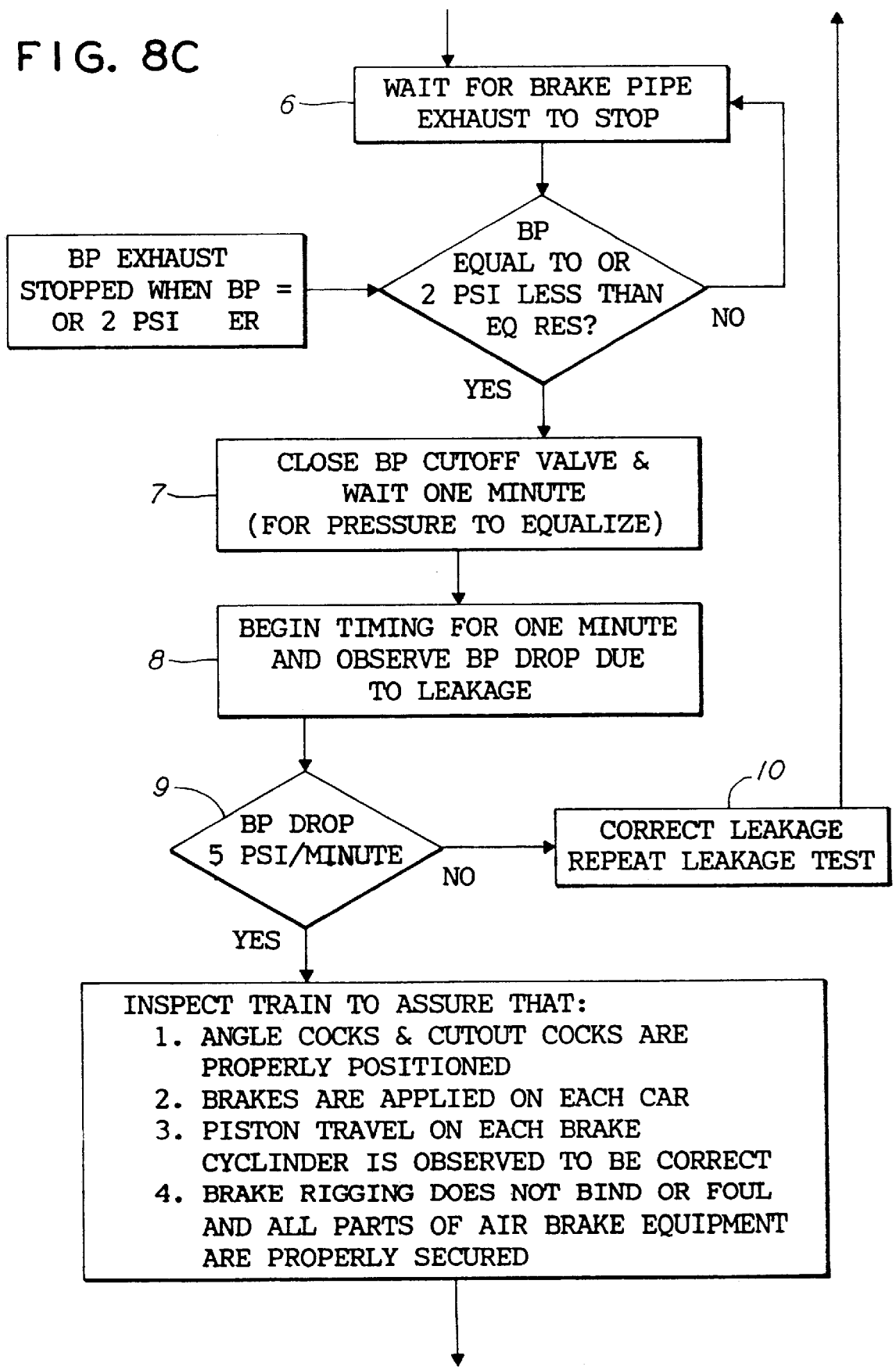
Figure 8D:
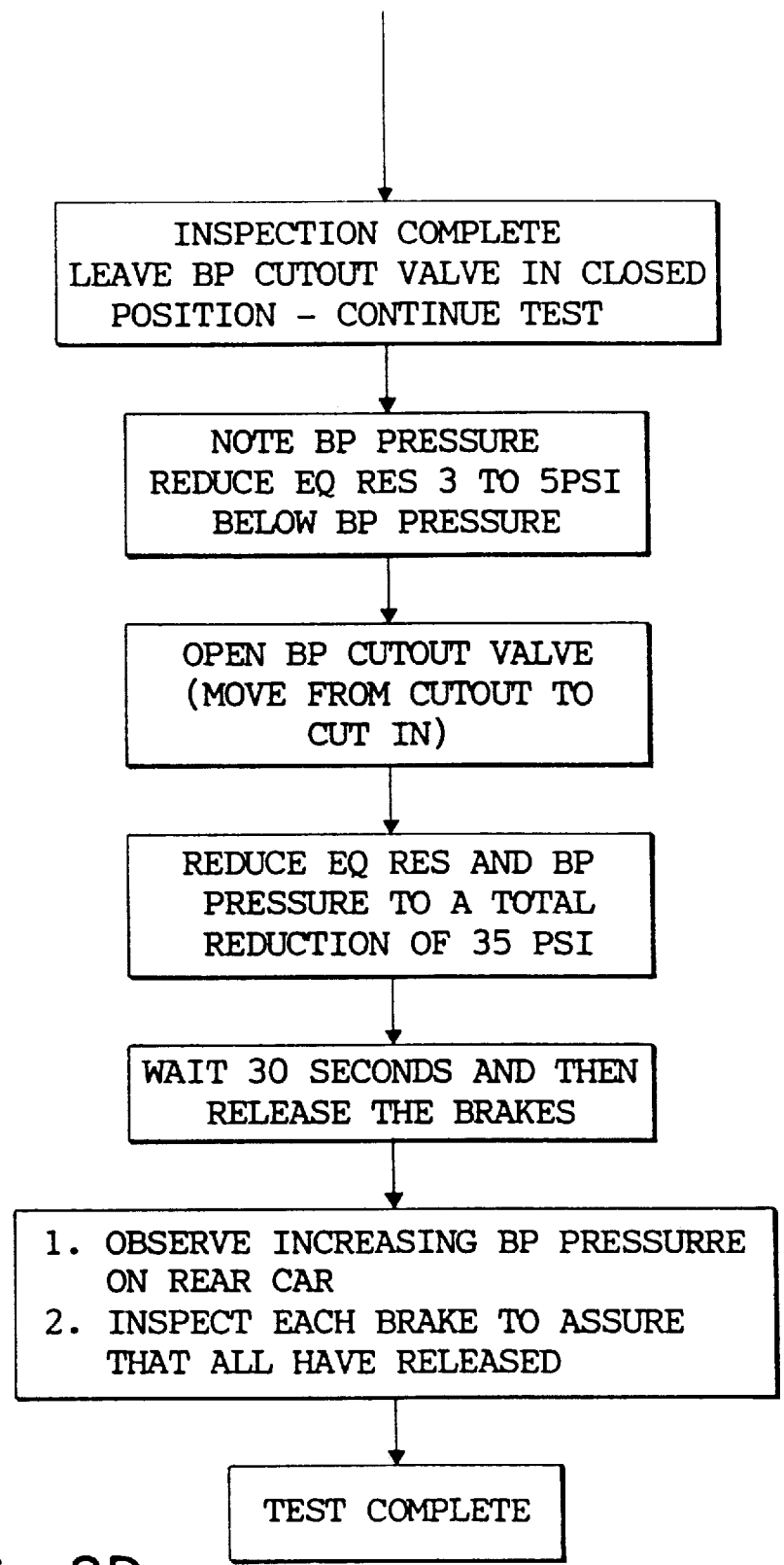

If the Traditional Brake Pipe Drop Pressure Method was to be performed using the automated terminal test system contemplated herein, in such an automated brake pipe leakage test no such railyard worker would be listening for the exhaust to stop so as to determine when the prefigured reduction in pressure within such brake pipe is complete. Consequently, the Improved Brake Pipe Drop Pressure Method, as illustrated in FIG. 8, allows sufficient time 16,26 for the prefigured reduction in pressure to occur within such brake pipe. The amount of time required for the prefigured reduction to occur depends on two parameters: the prefigured reduction itself and a measurement of the length of such train consist. Long, low leakage train consists typically take longer than short train consists for the brake pipe exhaust to stop. For example, for train consists less than 2500 feet in length 16a, a wait interval of approximately 25 seconds is sufficient for the brake pipe exhaust to stop. For train consists between 2500 and 5000 feet in length 16b, a wait interval of approximately 45 seconds is sufficient. For train consists between 5000 and 7500 feet in length 16c, a wait interval of approximately 60 seconds is sufficient. For train consists greater than 7500 feet in length 16d, a wait interval of approximately 90 seconds is sufficient for the brake pipe exhaust to stop.

Referring still to FIG. 8, similar to the Traditional Brake Pipe Drop Pressure Method, the Improved Brake Pipe Drop Pressure Method includes: charging 2 the brake pipe to within approximately 15 psi of a drop method setup pressure as measured at predefined points along such train consist; applying 4 such brake on each locomotive and each railcar in such train consist; and making the prefigured psi full service reduction 5 in the pressure within such brake pipe. The Improved Brake Pipe Drop Pressure Method, however, does not include the listening step (i.e., listening for exhaust from such brake pipe to stop 6 so as to determine when the prefigured reduction has been achieved). Instead the improved method requires determining 16 the length of the train consist and waiting 26 for a predetermined time for the reduction in pressure within such brake pipe to occur wherein the predetermined time depends upon the length of the train consist.

The subsequent steps of the Improved Brake Pipe Drop Pressure Method are similar to the Traditional Brake Pipe Drop Pressure Method. Specifically, closing 7 the brake pipe cutoff valve after waiting the predetermined time; waiting 7 a prespecified time during which such brake pipe pressure settles; monitoring 8 the leakage from such brake pipe for one minute; passing 10 such train consist from the brake pipe leakage test only if the leakage 9 does not exceed 5 psi during the one minute period; locating and repairing 10 the source(s) of leakage if such train consist fails the brake pipe leakage test; and repeating 10 the brake pipe leakage test after the source(s) of leakage have been located and repaired.

It should be noted that the train consist length parameter is currently not an input to such systems integrator in such non-standalone locomotives or to such cab integration equipment in such standalone locomotives and would have to be made available. The wait intervals associated with specific train consist lengths would have to be programmed into such systems integrator or such cab integration equipment. In the event that the train consist length parameter is unavailable, such railyard worker could input the train consist length parameter into a suitably modified version of the test control box or the portable radio controller herein described. Such railyard worker could then use the so modified automated terminal test system to perform the Improved Brake Pipe Drop Pressure Method.

While the presently preferred embodiment and an additional alternative embodiment and method for carrying out the instant invention has been set forth in detail according to the Patent Act, those persons skilled in the train consist brake equipment art to which this invention pertains will recognize various alternative ways of practicing the invention without departing from the spirit and scope of the appended claims.

Accordingly, to promote the progress of science and useful arts, I secure for myself by Letters Patent exclusive rights to all subject matter embraced by the following claims for the time prescribed by the Patent Act.

I claim:

1. A head of train unit of a type which monitors pressure within a brake pipe on a head of train vehicle and receives data from an end of train transceiver pertaining both to pressure within such brake pipe on a last railcar of such train and to movement of such last railcar and which conveys such brake pipe pressure data and such last railcar movement data to a brake equipment of such train, said head of train unit including:

(a) a means for receiving a terminal test mode activation signal from a portable radio controller and for allowing said head of train unit to react thereto only if said portable radio controller transmits an identifier code to which said head of train transceiver corresponds so as to enhance safety and security of operation; and (b) a means for relaying said terminal test mode activation signal to such brake equipment of such train, so as to enable such brake equipment to be placed in a terminal test mode of operation by a railyard worker remotely.

2. The head of train unit as recited in claim 1 wherein:

(a) said means for receiving also receives a brake release command signal from said end of train transceiver; and (b) said means for relaying also relays said brake release command signal to such brake equipment when such brake equipment is operating in said terminal test mode for initiating a test for determining whether brakes of such train have released.

3. The head of train unit as recited in claim 2 wherein:

(a) said means for receiving also receives a brake application command signal from said end of train transceiver; and (b) said means for relaying also relays said brake application command signal to such brake equipment when such brake equipment is operating in said terminal test mode for initiating a test for determining whether such brakes of such train have applied.

4. The head of train unit as recited in claim 3 wherein:

(a) said means for receiving also receives a brake leakage test command signal from said end of train transceiver; and (b) said means for relaying also relays said brake leakage test command signal to such brake equipment when such brake equipment is operating in said terminal test mode for initiating a brake pipe leakage test.

5. The head of train unit as recited in claim 1 wherein:

(a) said means for receiving also receives at least one of a brake leakage test signal, a brake release test signal and a brake application test signal from said portable radio controller; and (b) said means for relaying also relays said test signal(s) to such brake equipment of such train when such brake equipment is operating in said terminal test mode such that said brake release test signal is for remotely initiating a test for determining whether brakes of such train have released, said brake leakage test signal is for remotely initiating a brake pipe leakage test and said brake application test signal is for remotely initiating a test for determining whether such brakes of such train have applied.

* * * * *